United States Patent
Burke

(10) Patent No.: US 6,472,041 B1
(45) Date of Patent: Oct. 29, 2002

(54) MONOLITHIC SURFACING SYSTEM AND METHOD FOR MAKING SAME

(76) Inventor: Richard L. Burke, 2807 Walker Rd., Chattanooga, TN (US) 37421

( * ) Notice: Subject to any disclaimer, the term of this patent is extended or adjusted under 35 U.S.C. 154(b) by 0 days.

(21) Appl. No.: 09/514,877

(22) Filed: Feb. 28, 2000

(51) Int. Cl.⁷ .............................. B32B 3/02
(52) U.S. Cl. .................... 428/86; 428/87; 428/17; 472/92; 472/94
(58) Field of Search .............. 428/86, 87, 17; 472/92, 94

(56) References Cited

U.S. PATENT DOCUMENTS

| | | | |
|---|---|---|---|
| 3,616,126 A | * 10/1971 | Tungseth | 161/53 |
| 3,740,303 A | 6/1973 | Alderson et al. | |
| 3,801,421 A | 4/1974 | Allen et al. | |
| 3,995,079 A | 11/1976 | Haas, Jr. | |
| 4,044,179 A | * 8/1977 | Haas, Jr. | 428/17 |
| 4,301,207 A | * 11/1981 | Schomerus | 428/241 |
| 4,336,286 A | 6/1982 | Tomarin | |
| 4,364,331 A | * 12/1982 | Foenard | 119/28 |
| 4,389,435 A | 6/1983 | Haas, Jr. | |
| 4,396,653 A | 8/1983 | Tomarin | |
| 4,444,815 A | 4/1984 | Friedrich | |
| 4,497,853 A | 2/1985 | Tomarin | |
| 4,637,942 A | 1/1987 | Tomarin | |
| 4,735,825 A | 4/1988 | Friedrich | |
| 4,810,560 A | 3/1989 | Sell | |
| 4,897,302 A | 1/1990 | Bull | |
| 5,041,320 A | 8/1991 | Meredith et al. | |
| 5,183,438 A | * 2/1993 | Blom | 472/92 |
| 5,352,158 A | * 10/1994 | Brodeur, Jr. | 472/92 |
| 5,601,886 A | 2/1997 | Ishikawa et al. | |
| 5,605,721 A | 2/1997 | Di Geronimo | |
| 5,678,951 A | 10/1997 | Levasseur | |
| 5,961,389 A | * 10/1999 | Dickinson | 472/92 |
| 6,299,959 B1 | * 10/2001 | Squires et al. | 428/87 |

FOREIGN PATENT DOCUMENTS

| | | | |
|---|---|---|---|
| GB | 2 132 903 | * | 7/1984 |
| GB | 2 231 276 | * | 11/1990 |

* cited by examiner

Primary Examiner—Cheryl A. Juska
(74) Attorney, Agent, or Firm—Chambliss, Bahner & Stophel, P.C.

(57) ABSTRACT

A monolithic surfacing system is capable of being applied to almost any stable, compacted base which is capable of supporting the weight of the system. The system provides an economical solution to the cracking and degradation which is experienced with conventional artificial surfaces which are exposed to the elements or extended wear. The surfacing system includes a bottom layer comprised of a pile fabric having a flexible backing and a plurality of upstanding pile elements. Each of the pile elements has an upper and a lower end. The pile elements are in-filled with a quantity of in-fill material which is sufficient to form a layer of substantially uniform density extending from the flexible backing of the bottom layer to substantially the upper end of the pile elements. A quantity of binder is added to the system, and a top layer comprising a wear coating having an upper and a lower surface is applied to the in-fill material and binder. The binder serves to bind the components of the surfacing system together to create a monolithic structure.

17 Claims, 3 Drawing Sheets

MONOLITHIC SURFACING SYSTEM AND METHOD FOR MAKING SAME

FIELD OF THE INVENTION

The present invention relates to synthetic surfacing systems, including such systems that may be used for athletic playing surfaces.

BACKGROUND OF THE INVENTION

Traditionally, a number of natural and artificial surfaces have been used to create athletic playing surfaces such as basketball and tennis courts, soccer and football fields, and track and field venues. Frequently, artificial surfaces, such as the Astroturf brand of synthetic turf systems, are used inside domed stadiums and arenas instead of natural playing surfaces. Artificial surfaces may also be constructed for outdoor tracks, basketball courts and tennis courts in order to obtain particular surface characteristics (such as those relating to bounce or rebound) or in an attempt to eliminate the cost of maintaining a natural surface. In all such circumstances, it is desirable to achieve particular surface characteristics, depending on the nature of the use intended, while minimizing the cost of construction and maintenance.

While there are many varieties of athletic playing surfaces, all can be generally categorized as one of two types: (1) those which are intended to provide a hard-surfaced playing area; and (2) those which are designed to simulate a natural grass playing area. All of these surfaces are generally comprised of multiple layers of materials which are laid upon one another in some fashion.

Regardless of the type of system, the life of an artificial surfacing system may be determined by a number of factors, including the integrity of the system construction, the durability of the components of the system, the condition of the base upon which the system is placed, climate and weather conditions encountered by the system, the amount and nature of play on the surface and the passage of time.

Those surfacing systems which are designed to provide a substantially hard playing surface, such as tracks, basketball courts and tennis courts, are generally comprised of crushed rock or other similar material, asphalt or concrete pavements, or a multi-layer system that is built on top of a crushed rock or pavement base. Such systems are subject to the development of cracks or other forms of degradation of the playing surface as a result of weather and climate effects, improper construction, improper maintenance, normal or excessive use or wear, or simply the passage of time. In most cases, the cracking or degradation results in diminished playing characteristics such as "dead spots" or areas of the playing surface which do not possess the same qualities or characteristics as the remainder of the surface. Frequently, the owner of a cracked or degraded surface will elect to patch the playing surface in an attempt to avoid the expense of a complete resurfacing. While a patch may provide a temporary reprieve from further cracking and degradation, in most cases the patch is more susceptible to an accelerated failure than the original surface. Furthermore, it is likely that the patch will have different qualities and characteristics from the remainder of the playing surface. In order to restore the original quality and surface characteristics of the original system, it may be necessary to overlay the degraded or cracked surface with a new layer of the surfacing material. However, if the source of the failure is the underlying pavement or base material, it may be necessary to completely remove and reconstruct the entire playing surface system.

Artificial systems that are designed to provide a hard-surfaced playing area are generally rigid and unyielding, and consequently, they tend to impose higher levels of stress and strain on the joints of the user, unless the systems include layers of flexible materials such as urethane or acrylic encapsulated rubber. However, a disadvantage of such systems with flexible layers is that these layers tend to bubble and delaminate over time as moisture penetrates between the layers of the system or is transmitted through the underlying base pavement by way of hydrostatic pressure.

Artificial surfacing systems which are designed to simulate a grass playing surface generally incorporate a number of different layers including an asphalt, crushed rock or concrete base and a surface layer of tufted or woven pile fabric. Sometimes such systems include one or more intermediate layers. One such system, as described in U.S. Pat. No. 3,801,421 of Allen et al., includes an asphalt substrate, an intermediate layer of particulate vulcanized rubber bonded with polyisocyanurate resin, and a top layer of pile fabric including tufts of nylon, polypropylene or polyester that are designed to simulate natural grass. Another system of this type is described in U.S. Pat. No. 3,740,303 of Alderson et al., which includes a mat having an upper pile layer of nylon fibers tufted through a backing material. The upper pile layer is uniformly adhered to the upper surface of a non-woven batt by an adhesive and the batt is adhered to an underlying asphalt layer by an adhesive or to an underlying sand layer by a soil stabilizer. The height of the pile may be varied to best accommodate the intended use of the surface.

Other artificial playing surfaces of this type have incorporated in-fill materials which are placed on and into the upstanding pile tufts in order to create a playing surface which provides cushioning, resiliency, and a more natural turf feeling. For example, U.S. Pat. No. 3,995,079 of Haas describes a synthetic turf-like product comprising a pile fabric which includes a flexible backing and a plurality of generally upstanding pile elements. The pile elements are generally woven or knitted into the backing and are configured to resemble grass. A quantity of non-compacting, irregular shaped granular material, such as granulated coal slag, crushed granite and/or flint, is interspersed among the pile elements and on the backing of the pile fabric to a depth sufficient to substantially absorb the shock of objects impacting thereon.

Although the surfacing systems which employ woven or tufted fabrics and an in-fill material may simulate the feel and other characteristics of natural turf, such systems frequently require maintenance to prevent the in-fill material from dispersing or concentrating in one or more areas, thereby leaving other areas of the playing surface with inadequate support or unacceptable playing characteristics. Consequently, some such systems also employ binders to bond a portion of the in-fill material to the tufts so that such portion remains in position relative to the tufts and so that no shallow or unprotected areas develop in the bound portion of the in-fill layer. U.S. Pat. No. 4,396,653 of Tomarin describes a playing field surface formed of a synthetic fiber carpet, having generally upright pile fibers, upon which one or more layers of particulate covering is applied. The carpet, which is laid upon a support base of gravel or sand, includes woven base sheet, the lower side of which is coated with a rubber-type coating. Tufted through the base sheet are a plurality of fiber tufts having a length of one-half to two and one-half inches. The fibers are densely tufted so as to form a tightly packed, intertwined network. A first layer of rubber-like particles is applied to a predetermined depth to form a lower layer. A binder, such as a rubber adhesive or cement, may be sprayed or spilled upon the lower layer so as to trickle down between and connect the rubber particles. An upper layer, formed of sand-like particles, is then placed atop the lower layer. In most instances, the upper layer of particulate will be applied so that at least the tips of the fibers remain exposed. The sand-like upper layer and the exposed fibers combine to simulate a natural grass field and tend to reduce compaction of the fiber tufts. Of course, this upper layer is still subject to shifting and dispersing, and consequently, would still require periodic maintenance to retain consistent performance characteristics.

Although known surfacing systems are suitable for use either as a simulated grass surface or as a hard surface, none of the known systems are adaptable for either type of use. It would be desirable, therefore, if a surfacing system could be developed which is adaptable to various types of use, including use as a driveway or parking area surface. It would be also desirable if a monolithic surfacing system could be developed that may be installed on a variety of compacted base materials without requiring the removal, grading or planing thereof, and which would not show, transmit or be affected by defects or cracks in the base materials. It would also be desirable if a surfacing system could be developed that offered the advantages of systems containing in-fill materials but without the post-installation maintenance typical of such surfacing.

ADVANTAGES OF THE INVENTION

The present invention provides a surfacing system containing a-pile fabric, an in-fill material, a wear coating, and a binder that are bound together in monolithic structure. Such a surfacing system can be applied over an existing pavement or other base, which may or may not have existing defects such as cracks, in such a manner that such defects in the base will not usually affect the surface characteristics or quality of the newly installed surfacing system. Another advantage of the invention is that the surfacing system may be applied to a non-level base material in such manner that the resulting surface is substantially planar and monolithic.

Another advantage of the present invention is that it provides a surface which exhibits good shock absorption characteristics for an athlete, while providing the necessary attributes which ensure the proper feel (i.e. roll and bounce or rebound) of a ball which may be used thereon. It is another advantage of the present invention that the same system can be used to produce a variety of surfaces having different characteristics, for both athletic and non-athletic end uses, by varying the length of the pile elements, the amount or type of in-fill material, the amount or type of binder, and the amount or type of the wear coating or finish.

It is another advantage of the invention to provide a surfacing system which is more durable than standard asphalt or concrete finishes and which can be used for virtually continuous play for long periods of time without exhibiting unacceptable wear. Another advantage of the invention is that its various components and layers are contained in a monolithic structure which is not susceptible to moisture intrusion, and consequently is not susceptible to bubbling or delamination of any of its components. It is yet another advantage of the invention that it may be economically repaired or rejuvenated in the event that it is damaged.

It is another advantage of the invention that the pile fibers employed in the surfacing system are neither exposed to the elements nor exposed in the playing surface, so that they do not need to exhibit the same appearance qualities (i.e. ultraviolet stabilization, depth of color and colorfastness) as pile fibers used in other systems, thereby allowing for a reduction in the production cost of the surfacing system.

Other advantages and features of the present invention will become apparent to those skilled in the art to which the invention relates from an examination of the drawings and ensuing description.

EXPLANATION OF TECHNICAL TERMS

As used herein, the term athletic surface or playing surface refers to any surface, such as a grass field, asphalt or concrete surface, synthetic surface, basketball court, tennis court or the like, upon which an athletic activity may take place.

As used herein, the term artificial surfacing system or surfacing system refers to any playing surface or other artificial surface that is constructed of various components. Such systems typically are comprised of a plurality of sequentially-placed layers or components that may or may not be bound together.

As used herein, the term base refers to a surface or layer upon which the surfacing system is applied or constructed.

As used herein, the term binder refers to material which may be added between or among the various components of an artificial surfacing system so as to bind the components of the system, or at least some of them, together.

As used herein, the terms pile elements, pile fibers and tufts refer to fibers and filaments that may be woven, knitted or tufted into a backing.

As used herein, the terms in-fill, in-fill material and filler refer to the materials or combination of materials which are interspersed between and amongst the pile elements of the surfacing system.

SUMMARY OF THE INVENTION

The surfacing system of the present invention comprises a monolithic system having a top layer and a bottom layer. The bottom layer includes a pile fabric having a flexible backing and a plurality of upstanding pile elements, each of which has an upper and a lower end. The system also includes a quantity of in-fill material which is sufficient to form a layer of substantially uniform density extending from the flexible backing of the bottom layer to substantially the upper end of the pile elements when it is interspersed amongst the pile elements. The top layer comprises a wear coating or layer having an upper and a lower surface, and the system includes a binder which binds the bottom layer, the in-fill layer and the top layer together to create a monolithic structure.

The invention also includes a method of forming the surfacing system disclosed herein. According to this method, a pile fabric is provided. This fabric has a flexible backing and a plurality of generally upstanding pile elements, each of which has an upper end and a lower end. A quantity of in-fill material is applied amongst the generally upstanding pile elements to form a layer of in-fill material of substantially uniform density extending from the flexible backing of the pile fabric to substantially the upper ends of the pile elements. A binder is then applied to the pile fabric and in-fill material and a wear coating or finish coating is applied to the top of the layer of in-fill material so that at least some of the upper ends of the pile elements penetrate and are bound to the lower surface of the wear coating.

Stated somewhat more specifically, a preferred embodiment of the present invention includes a polypropylene pile fabric which is tufted to a flexible backing. A non-skid, moisture-resistant coating is then applied to the bottom of the backing. A quantity of in-fill material, having a particle size that is less than 30 U.S. Screen mesh and which comprises sand, lava, rock, particles of cork or ceramic material, or a combination thereof, is uniformly interspersed amongst the polypropylene pile elements until the in-fill material forms a layer of substantially uniform density which extends from the flexible polypropylene backing to the upper ends of the pile elements. A binder is applied to the pile fabric and in-fill material. A wear coating, preferably an acrylic latex material, is applied to the top of the layer of in-fill material so that at least some of the upper ends of the pile elements contact and are bound to the lower surface of the wear coating, wherein the pile elements reinforce the system and anchor the top layer of the system to the bottom layer of the system. The binder acts to bind all of the system components together so as to create a monolithic surfacing system for use as a playing surface, walkway, driveway, parking area or the like.

In order to facilitate an understanding of the invention, preferred embodiments of the invention are illustrated in the drawings, and a detailed description thereof follows. It is not intended, however, that the invention be limited to the particular embodiments described. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout and in which.

DESCRIPTION OF THE PREFERRED EMBODIMENTS OF THE INVENTION

Figure 1:
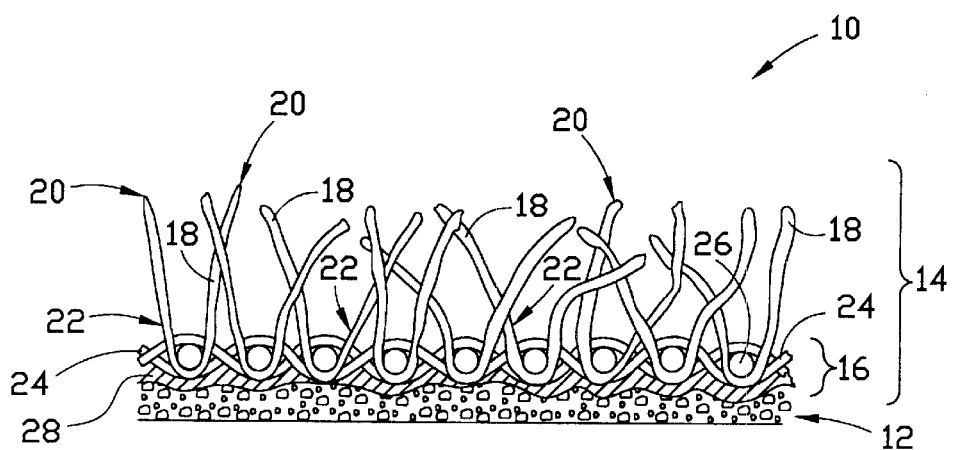
FIG. 1 is a cross-sectional view of a portion of a preferred embodiment of the surfacing system according to the present invention, showing a first intermediate stage of its construction, as placed on a relatively level base.

FIG. 1 illustrates the first intermediate stage 10 of construction of a preferred embodiment of a surfacing system for use as an athletic surface or other surface according to the invention. The surfacing system is supported on a stable base 12 of crushed and compacted rock, although the system may be placed on other base materials such as asphalt or concrete, compacted cinders, dirt, clay, or the like. The base should be compacted so that settling ,is not likely to occur after the installation of the system, but may be of any thickness which is capable, of supporting the weight of the system.

The system includes bottom layer 14 having a flexible backing 16 and a plurality of upstanding pile elements 18, each of which has an upper end 20 and a lower end 22. The backing holds the pile elements in place during construction and helps provide stability of the system separate from base 12. Although it is contemplated that the flexible backing 16 of the bottom layer 14 may be a woven, knitted, felted or extruded web or combination of such backings, it is preferred that flexible backing 16 be a woven polypropylene fabric such as is commonly used in carpet construction. Such fabric includes warp type strands 24 and woof type strands 26. Pile elements or tufts 18 are preferably tufted or interfitted through the strands of the backing, although they may also be secured to backing 16 by weaving, knitting, or by other ways known to those having ordinary skill in the art to which the invention relates. It is preferred that elements 18 are initially woven, knitted or tufted as high loops which may then be cut to present ends or elements 18. In the alternative, the pile elements may be tufted in loops which are not subsequently cut (not shown). In yet another alternative embodiment, the pile elements may be interfitted into the backing as individual elements.

Elements 18 are preferably monofilaments which have been extruded from materials such as polyamides, polyesters, olefinic homopolymers such as polypropylene and copolymers such as filament-forming polypropylene. Carpet fibers and yarns of various types may also be used. The pile elements may be of any length which will achieve the function and characteristics described and claimed herein, but are preferably between one-eighth (0.125) inch and three and one-half (3.5) inches in length. However, the length and density of the individual pile; elements used in a particular embodiment of the invention will be determined in part by the use for which the system is intended and by the characteristics or feel (e.g. hardness, rebound, roll, etc.) which it is desired that the system possess. Thus, for example, if more shock absorbancy is desired, such as for use in a running track, longer pile elements will typically be used, whereas, if it is desired to have a more compact surfacing system with less shock absorption, such as for use in a driveway, shorter and/or denser pile elements will typically be used. The pile elements may also be trimmed to provide for a level surfacing system if placed on a non-level base, as described in more detail below.

It is also preferred that a resin coating 28 be provided on the bottom side of backing 16 to prevent the infiltration of moisture or contaminates therethrough. Coating 28 may also comprise a non-skid material so that once the surfacing system is properly installed, the system will not be inadvertently moved from its desired position.

Figure 2:
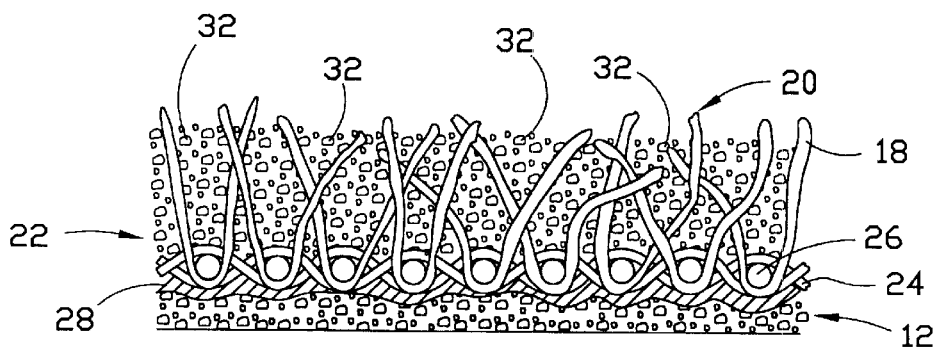
FIG. 2 is a cross-sectional view of the surfacing system as illustrated in FIG. 1, but showing a second intermediate stage of its construction, in which a quantity of in-fill material has been applied to the bottom layer of the system.

FIG. 2 illustrates a second stage 30 of construction of the surfacing system, in which a quantity of in-fill material 32 is interspersed amongst the pile elements of FIG. 1. The in-fill material may vary in composition and in particle size but preferably will have a particle size of less than 30 U.S. Screen Mesh, and preferably comprises sand, lava, rock, particles of cork or ceramic materials or any combination of such materials. The in-fill material is provided in an amount which is sufficient to form a layer of substantially uniform density extending from the flexible backing to substantially the upper ends 20 of pile elements 18.

Figure 3:
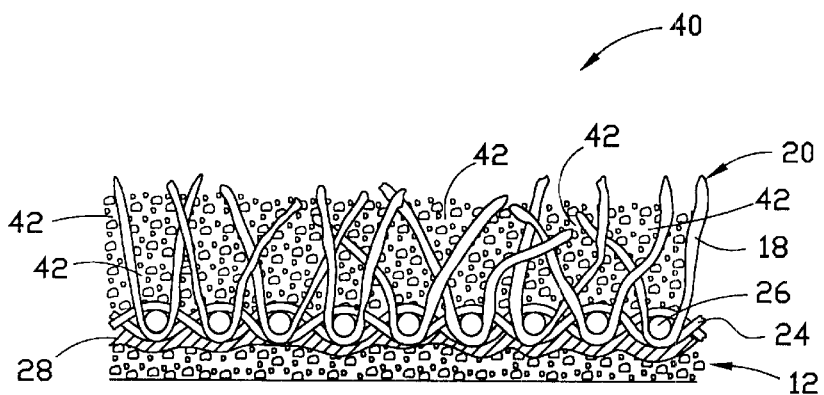
FIG. 3 is a cross-sectional view of the surfacing system as illustrated in FIGS. 1 and 2, but showing a third intermediate stage of its construction, in which a quantity of binder has been applied to the bottom layer of the system and the in-fill material.

FIG. 3 illustrates a third stage 40 of construction of the surfacing system, in which a binder 42 is interspersed among the in-fill material so as to bind the bottom layer and the in-fill layer together. The binder is preferably applied in liquid form and, in a preferred embodiment of the invention, may be urethane or an acrylic latex resin, or carboxylated styrene butadiene. Otherwise, the binder may be any natural or synthetic binder which exhibits the characteristics described or claimed herein. Preferably, the binder is injected into the pile fabric in a sufficient quantity so as to come into contact with the surface of each pile element and substantially all of the pieces of in-fill material. In addition to binding or fusing each of the components in the invention to one another, the binder also makes the surfacing system non-porous. The quantity of binder necessary to properly saturate the surfacing system will depend on the height of the pile fabric, the amount of in-fill material being used, and the desired shock absorption characteristics of the finished surfacing system. While it is preferred to inject enough binder to cover the majority of the surfaces of the top side of backing 16, the pile elements 18, and the in-fill material 32, it is also desirable that the binder and in-fill material not rise above the upper ends 20 of the pile elements. The binder, in-fill material, and pile elements are each an essential element to the matrix of the structure and will be modified in relation to one another to achieve or control the resiliency of the system.

Figure 4:
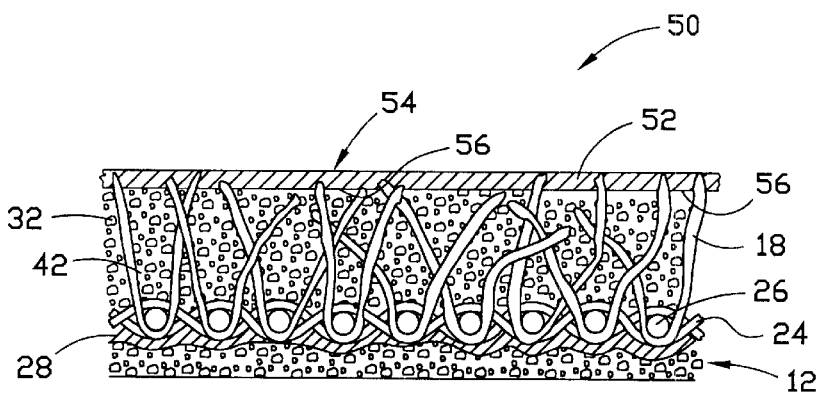
FIG. 4 is a cross-sectional view of the surfacing system as illustrated in FIGS. 1–3, but showing the completed construction, in which a wear coating has been applied atop the in-fill material.

FIG. 4 illustrates the completed construction 50 of the surfacing system of the invention. As shown therein, the invention also includes a top layer 52 comprising a wear coating having an upper surface 54 and a lower surface 56. In a preferred embodiment of the surfacing system, top layer 52 comprises a wear coating or finish comprised of an acrylic latex material, EPDM elastomer, a combination of acrylic latex and EPDM, or a paint. The top layer 52 of the surfacing system 50 is applied on top of the in-fill material so that at least some of the upper ends 20 of the pile elements 18 contact and are bound to the lower surface 56 of the wear coating in such a manner that the pile elements reinforce the system 50 and anchor the top layer 52 to the bottom layer 14 (see FIG. 1). In a preferred embodiment of the present invention, the upper ends 20 of the majority of the pile elements 18 penetrate into the top layer wear coating a distance of at least 0.05 millimeters.

Referring again to FIG. 3, if in the construction of the system, the addition of the binder 42 causes the in-fill and binder material to achieve a level which is higher than the upper ends 20 of the pile elements (not shown), the wear coating 52 (see FIG. 4) must be of sufficient weight to compress the in-fill and binder material so as to allow the lower surface 56 of the wear coating or finish coating to contact and become bound to at least some of the upper ends 20 of the pile elements 18 (as shown in FIG. 4).

It is also preferred that the upper surface 54 of the top layer wear coating 52 is substantially planar. The upper layer wear coating may also be colored or lined to indicate boundaries, yard lines or parking spaces. It is also desirable that the top layer wear coating be non-porous and moisture resistant. Once the wear coating has dried and the binder has fixed the components of the surfacing system to one another, the system 50 is complete and ready to be used. Referring again to FIGS. 1–4, binder 42 binds the bottom layer 14, the in-fill material 32, and the top layer 52 together to create a monolithic structure.

If the surfacing system is to be applied to a base which is not self-draining (e.g. concrete or asphalt) or is likely to collect water thereon, it is also desirable to place one or more drains (not shown) in the base 12 so that fluids which may be introduced or develop between the base and the surfacing system may be removed. The removal of those fluids will significantly reduce the chance of bacteria, mold or the like forming on the underside of the bottom layer of the system.

Figure 5:
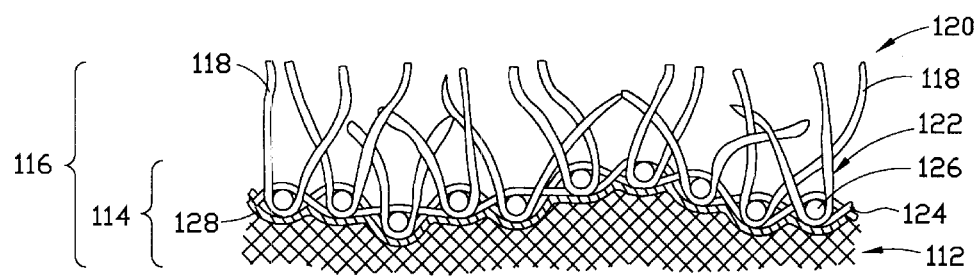
FIG. 5 is a cross-sectional view of a portion of the surfacing system according to the present invention, showing a first intermediate stage of its construction, as placed on a non-level base.
Figure 6:
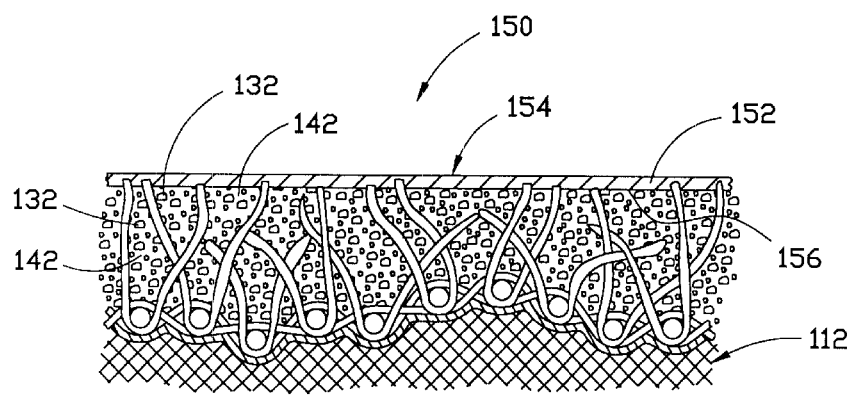
FIG. 6 is a cross-sectional view of the surfacing system of FIG. 5, with the upper ends of the pile elements having been trimmed to produce a substantially level upper surface for the wear coating, and the construction having been completed.

Referring now to FIGS. 5 and 6, it is also contemplated that the surfacing system may be installed or used in a location where the base 112 upon which system rests is non-level. In such an instance, it is generally desired that the invention produce a playing surface or other surface which is substantially level. As shown in FIG. 5, the system is preferably formed by providing a pile fabric 114 having a flexible backing 116 and a plurality of generally upstanding pile elements 118. Pile elements 118 of the system of FIG. 5, having upper ends 120 and lower ends 122, correspond to pile elements 18, upper ends 20 and lower ends 22 of the system of FIGS. 1–4. In the same way, flexible backing 116 of the system of FIG. 5, having warp type strands 124, woof type strands 126 and resin coating 128, corresponds to flexible backing 16 of the system of FIGS. 1–4, which has warp type strands 24, woof type strands 26 and resin coating 28. The flexible backing 116 is applied to a stable, and preferably compacted, base 112, which may not be level, however. In such event, the upper ends 120 of pile elements 118 may be trimmed to a substantially uniform height relative to the mean level of the base 112, so that some of the pile elements are longer than others.

FIG. 6 illustrates the completion of the construction of the surfacing system 150 under these conditions, in which a quantity of in-fill material 132 is distributed amongst the generally upstanding pile elements 118 to form a layer of in-fill material of substantially uniform density extending from the flexible backing 116 of the pile fabric 114 to substantially the upper ends 120 of the pile elements 118. A binder 142 is applied to the pile fabric and in-fill material, and a top layer 152 comprising a wear coating having an upper surface 154 and a lower surface 156 is applied to the top of the layer of in-fill material so that at least some of the upper ends 120 of the pile elements 118 penetrate and are bound to the lower surface 156 of the wear coating 152. The in-fill material will not be of uniform depth, but it will preferably be of substantially uniform density throughout the system. However, where the pile elements are trimmed to make a level surface, the rolling and rebounding characteristics of the surfacing system 150 may not be uniform throughout, but such system may nevertheless be suitable for uses such as a driveway, bike trail, walking trail or the like.

Alternatively, rather than trimming the upper ends 120 of the pile elements 118 prior to applying the in-fill material to the pile fabric 114, the in-fill material 132 may be added to form a layer of substantially uniform density extending from the flexible backing 116 to substantially. the upper end of the lowermost extending pile elements (not shown). The in-fill material will not be of uniform depth. After the in-fill material 132 or in-fill and binder material 142 have been added, the upper ends of the pile elements may then be trimmed to a length such that they define a substantially level surface and preferably extend at least about 0.05 millimeters above the layer of in-fill and binder material. A wear coating 152 may then be applied to the top of the layer of in-fill material so that at least some of the upper ends 120 of the pile elements penetrate and are bound to the lower surface 156 of the wear coating. By trimming the ends of the pile elements after the application of the in-fill material, a more level surface of pile elements extending above the layer of in-fill and binder material will result than that which is obtained where the pile elements are trimmed prior to the application of in-fill material. Such construction technique also is less likely to result in the application of or the weight of the in-fill and binder material bending or knocking down the elements 118 prior to the application of the wear coating.

Although this description contains many specifics, these should not be construed as limiting the scope of the invention but merely as providing illustrations of the some of the presently preferred embodiments thereof, as well as the best mode contemplated by the inventor of carrying out the invention. The invention, as described herein, is susceptible to various modifications and adaptations, and the same are intended to be comprehended within the meaning and range of equivalents of the appended claims.

What is claimed is:

1. A surfacing system having a top layer and a bottom layer, said system comprising:
   (a) a bottom layer including a pile fabric having a flexible backing and a plurality of upstanding pile elements, said pile elements each having an upper and a lower end;
   (b) a quantity of in-fill material which is sufficient to form a layer of substantially uniform density extending from the flexible backing of the bottom layer to substantially the upper end of the pile elements when it is interspersed amongst the pile elements;
   (c) a top layer comprising a wear coating having an upper and a lower surface; and
   (d) a binder which binds the bottom layer, the in-fill layer and the top layer together to create a monolithic structure;
      wherein the wear coating is applied on top of the in-fill material so that the upper ends of at least some of the pile elements contact and are bound to the lower surface of the wear coating, and wherein the pile elements reinforce the system and anchor the top layer to the bottom layer.

2. The surfacing system of claim 1 wherein the majority of the upper ends of the pile elements contact and are bound to the lower surface of the wear coating.

3. The surfacing system of claim 1 wherein the backing has a top side and bottom side and where the bottom side optionally has a coating to prevent infiltration of moisture or contaminates therethrough.

4. The surfacing system of claim 3 wherein the coating on the bottom side includes a non-skid material.

5. The surfacing system of claim 1 Wherein the flexible backing is a woven polypropylene fabric and the pile elements are formed from polypropylene.

6. The surfacing system of claim 1 wherein the in-fill material optionally varies in particle size.

7. The surfacing system of claim 1 wherein the in-fill material has a particle size that is less than 30 U.S. Screen Mesh.

8. The surfacing system of claim 1 wherein the in-fill material comprises sand, lava rock, particles of cork or ceramic material, or a combination thereof.

9. The surfacing system of claim 1 wherein the binder is selected from the group consisting of urethane or acrylic latex resin binders and carboxylated styrene butadiene.

10. The surfacing system of claim 1 wherein the top layer wear coating is selected from the group consisting of acrylic latex material, paint, EPDM elastomer, and a combination of acrylic latex and EPDM elastomer.

11. The surfacing system of claim 1 wherein the pile elements extend into the top layer wear coating a distance of at least about 0.05 millimeters.

12. The surfacing system of claim 1 wherein the upper surface of the top layer wear coating is substantially planar.

13. The surfacing system of claim 1 wherein the top layer wear coating is colored.

14. The surfacing system of claim 1 wherein the top layer wear coating is non-porous.

15. A method for forming a surfacing system, said method comprising:
   (a) providing a pile fabric having a flexible backing and a plurality of generally upstanding pile elements, wherein each pile element has an upper and a lower end;
   (b) applying a quantity of in-fill material amongst the generally upstanding pile elements to form a layer of in-fill material of substantially uniform density extending from the flexible backing of the pile fabric to substantially the upper ends of the pile elements;
   (c) applying a binder to the pile fabric and in-fill material; and
   (d) applying a wear coating to the top of the layer of in-fill material so that at least some of the upper ends of the pile elements penetrate and are bound to the lower surface of the wear coating.

16. The method of claim 15 which includes applying the surfacing system to a stable base.

17. The method of claim 15, which includes trimming the ends of the pile elements to a substantially uniform height.

* * * * *